Patented Aug. 17, 1926.

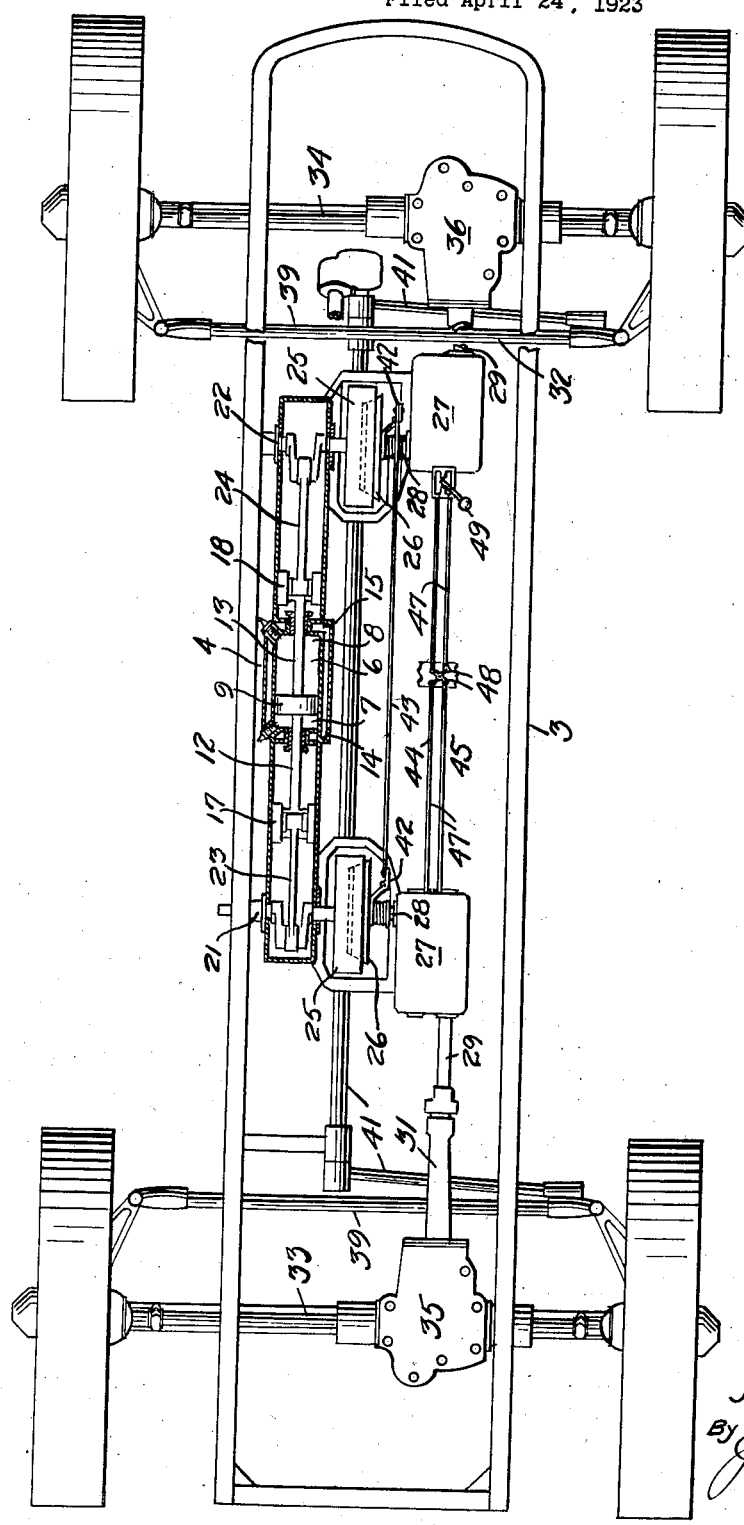

1,596,174

UNITED STATES PATENT OFFICE.

JOHN H. GRABAU, OF LIVERMORE, CALIFORNIA.

POWER-TRANSMISSION SYSTEM FOR VEHICLES.

Application filed April 24, 1923. Serial No. 634,396.

My invention relates to a system of power transmission for motor vehicles, particularly to vehicles having a front and rear drive.

An object of the invention is to drive a vehicle by power taken from the engine at both ends of the cylinder.

Another object of the invention is to take power from a double-acting internal combustion engine at the two ends of the cylinder for separately driving the front and rear wheels of a vehicle.

A further object of the invention is to provide a power transmission system having the foregoing features and in which the corresponding units at the front and rear ends of the vehicle may be simultaneously operated or controlled.

The invention possesses other and features of advantage, some of which, with the foregoing, will be set forth in the following description of the preferred form of my invention which is illustrated in the drawings accompanying and forming part of the specification. It is to be understood that I do not limit myself to the showing made by the said drawing and description, as I may adopt variations of the preferred form within the scope of my invention as set forth in the claims.

The drawing is a plan view of a vehicle chassis equipped with the system of my invention.

As illustrated in the drawing the vehicle 3 which is shown in the form of a tractor, is driven by an internal combustion engine 4 of the double acting type. The engine as here shown is mounted centrally between the ends of the tractor and comprises a cylinder 6 having explosion chambers 7 and 8 at its opposite ends. Mounted within the cylinder for reciprocation between the explosion chambers is a piston 9 provided at its opposite ends with piston-rods 12 and 13 which respectively extend through the end walls 14 and 15 of the cylinder and are associated with cross heads 17 and 18. The piston-rods are connected to separate crankshafts 21 and 22 by means of connecting-rods 23 and 24.

The power from the crank-shafts may be conveyed to the front and rear wheels by any suitable means, and I desire to have it expressly understood that I do not limit myself to any particular type of such means. As here shown a fly-wheel 25 is mounted on each crankshaft and is associated with a clutch 26. A selective sliding transmission 27 in which the drive and driven shafts 28 and 29 are arranged at right angles, is preferably interposed between the clutches and propellor shafts 31 and 32, the latter being geared to the driving axles 33 and 34 at opposite ends of the vehicle through differentials 35 and 36 respectively.

Steering of the vehicle may be effected through the front or rear wheels or both, by providing wheels with the usual steering knuckles. When as here shown, both front and rear wheels are used for steering, the steering cross-rods 39 associated with the wheels of the respective axles, are connected together by the usual linkage 41.

Power is preferably delivered to the wheels from the driving axles by means of gearing, the necessary flexibility being obtained through universal joints.

The clutches are arranged to be operated simultaneously and for this purpose, the levers 42 thereof are connected together by a rod 43. Means are also provided for causing the transmission gears at the opposite ends of the vehicle to be correspondingly and simultaneously shifted. In the present embodiment the forks for sliding the corresponding transmission gears are adapted to be connected together by shifter rods 44 and 45 each of which comprises a pair of links 47 connected to the opposite ends of a lever 48. The rods 44 and 45 are adapted to be moved by a gear shifting lever 49 in the ordinary manner.

I claim:—

1. In a motor vehicle, the combination of an engine having a cylinder and a piston mounted for reciprocation therein, crank shafts at both ends of said cylinder, connections between said crank shafts and the adjacent ends of said piston driving wheels at opposite ends of the vehicle, independent driving connections between said crank shafts and the respective driving wheels and including selective transmissions, and controlling means for simultaneously and correspondingly operating said transmissions.

2. In a motor vehicle, the combination of an engine having a cylinder and a piston mounted for reciprocation therein, crank shafts at both ends of said cylinder, connections between said crank shafts and the adjacent ends of said piston, driving wheels at opposite ends of the vehicle, independent driving connections between said crank shafts and the respective driving wheels and including clutches, and controlling means for simultaneously and correspondingly operating said clutches.

3. In a motor vehicle, the combination of an engine having a cylinder and a piston mounted for reciprocation therein, crank shafts at both ends of said cylinder, connections between said crank shafts and the adjacent ends of said piston, driving wheels at opposite ends of the vehicle, independent driving connections between said crank shafts and the respective driving wheels and including clutches, and selective transmissions and controlling means for simultaneously and correspondingly operating said clutches and said transmissions.

In testimony whereof, I have hereunto set my hand at Oakland, this 9th day of April 1923.

JOHN H. GRABAU.